(12) United States Patent
Zaman

(10) Patent No.: US 6,490,426 B1
(45) Date of Patent: Dec. 3, 2002

(54) MODULAR IMAGING MEMBER FLANGE ASSEMBLY

(75) Inventor: Kamran U. Zaman, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/705,271

(22) Filed: Nov. 3, 2000

(51) Int. Cl.⁷ .............................................. G03G 15/00
(52) U.S. Cl. ...................................... 399/117; 399/167
(58) Field of Search .................................. 309/117, 167

(56) References Cited

U.S. PATENT DOCUMENTS

| | | | |
|---|---|---|---|
| 4,120,576 A | 10/1978 | Babish | 355/3 DR |
| 4,386,839 A | 6/1983 | Kumagai et al. | 355/3 DR |
| 4,400,077 A | 8/1983 | Kozuka et al. | 355/3 DR |
| 4,561,763 A | 12/1985 | Basch | 355/3 DR |
| 4,839,690 A | 6/1989 | Onoda et al. | 355/211 |
| 4,914,478 A | 4/1990 | Yashiki | 355/211 |
| 4,975,744 A | 12/1990 | Ebata et al. | 355/211 |
| 5,052,090 A | 10/1991 | Kitaura et al. | 29/123 |
| 5,210,574 A | 5/1993 | Kita | 355/211 |
| 5,357,321 A | 10/1994 | Stenzel et al. | 355/211 |
| 5,402,207 A | 3/1995 | Michlin | 355/200 |
| 5,461,464 A | 10/1995 | Swain | 335/211 |
| 5,576,803 A | 11/1996 | Williams et al. | 355/211 |
| 5,579,093 A | 11/1996 | Wagner et al. | 355/211 |
| 5,599,265 A | 2/1997 | Foltz | 492/47 |
| 5,630,196 A | 5/1997 | Swain | 399/117 |
| 5,632,684 A | 5/1997 | Kumar et al. | 464/179 |
| 5,634,175 A | 5/1997 | Michlin et al. | 399/90 |
| 5,655,182 A | 8/1997 | Sanchez et al. | 399/117 |
| 5,752,136 A | 5/1998 | Sanchez et al. | 399/117 |
| 5,815,773 A | 9/1998 | Zaman | 399/117 |
| 5,893,203 A | 4/1999 | Buttrick, Jr. | 29/407.05 |
| 5,930,562 A | * 7/1999 | Noda et al. | 399/114 |
| 6,104,896 A | 8/2000 | Zaman et al. | 399/117 |

* cited by examiner

Primary Examiner—Quana M. Grainger
(74) Attorney, Agent, or Firm—Andrew D. Ryan

(57) ABSTRACT

A flange assembly having modular mounting features for receiving and removably securing a component such as a gear thereon. The flange assembly is for use with an imaging member such as a photoreceptor drum.

24 Claims, 5 Drawing Sheets

FIG. 1
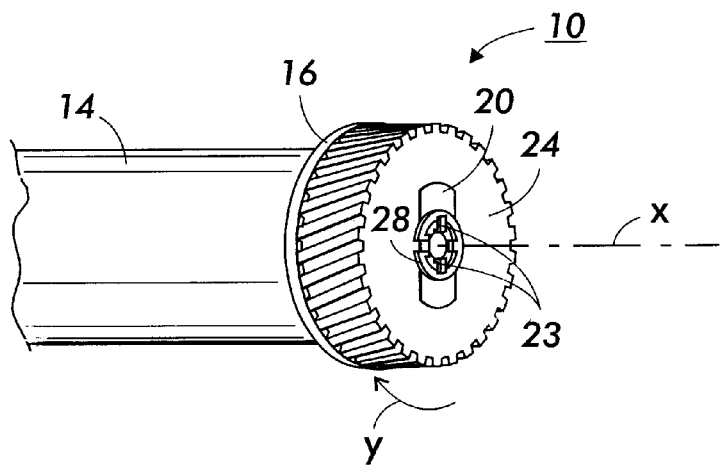
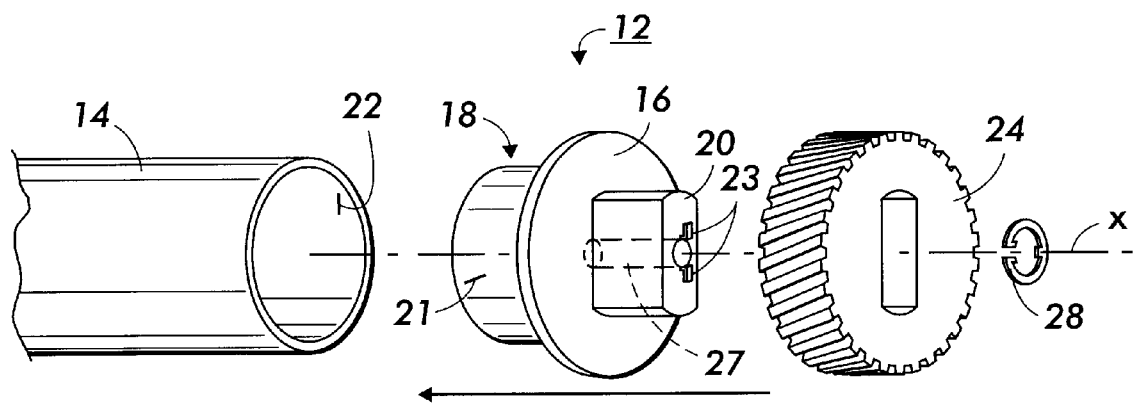
FIG. 2

FIG. 7
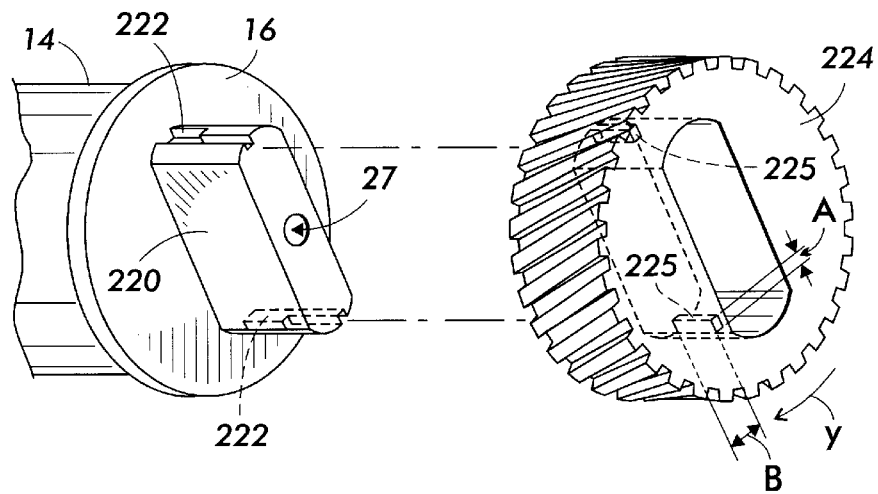
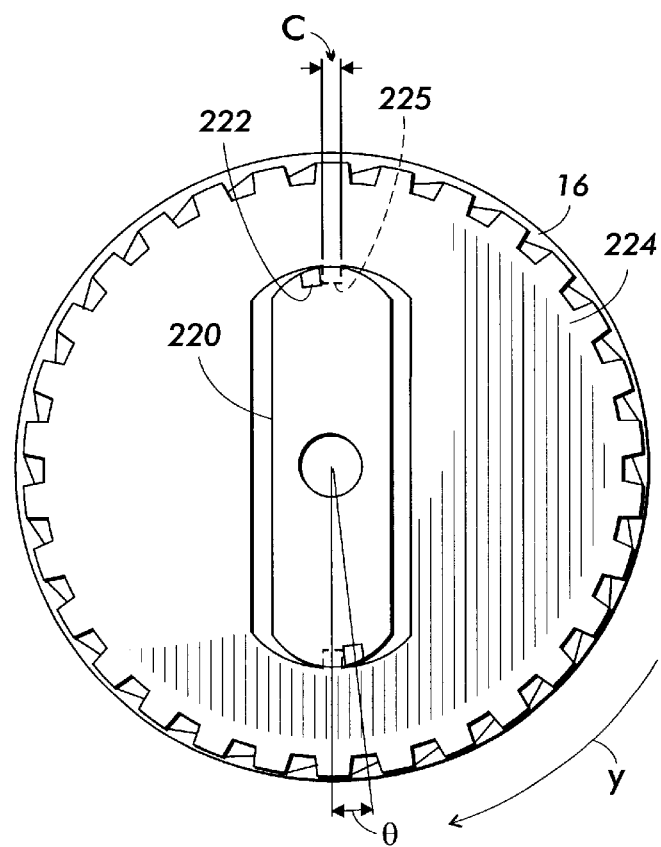
FIG. 8

MODULAR IMAGING MEMBER FLANGE ASSEMBLY

FIELD OF THE INVENTION

The present invention relates to a flange and more specifically to a modular flange system adaptable for use with various sized components such as gears and for use with an imaging member such as a photoreceptor that is used in electrostatographic imaging machines, devices, and processes, including digital and color systems.

BACKGROUND OF THE INVENTION

The xerographic imaging process includes charging a photoconductive member to a uniform potential, and then exposing a light image of an original document onto the surface of the photoreceptor. Exposing the charged photoreceptor to light selectively discharges areas of the surface while allowing other areas to remain unchanged, thereby creating an electrostatic latent image of the document on the surface of the photoconductive member. A developer material is then brought into contact with the surface of the photoreceptor to transform the latent image into a visible reproduction. The developer typically includes toner particles with an electrical polarity opposite that of the photoconductive member. A blank copy sheet is brought into contact with the photoreceptor and the toner particles are transferred thereto by electrostatic charging the sheet. The sheet is subsequently heated, thereby permanently affixing the reproduced image to the sheet. This results in a "hard copy" reproduction of the document or image. The photoconductive member is then cleaned to remove any charge and/or residual developing material from its surface to prepare it for subsequent imaging cycles.

Various imaging and photoreceptor systems are disclosed in U.S. Pat. Nos. 4,120,576; 4,386,839; 4,400,077; 4,561,763; 4,839,690; 4,914,478; 4,975,744; 5,052,090; 5,210,574; 5,357,321; 5,402,207; 5,461,464; 5,599,265; 5,630,196, 5,634,175; 5,752,136; 5,815,773; 5,893,203; and 6,104,896, the disclosures of which are incorporated by reference in their entireties.

The modularity of components is important for manufacturers of sophisticated electronic equipment such as electrostatographic imaging machines. Thus, a need remains for a modular flange system for use with mountable components to facilitate efficiency in manufacturing and in recycling. There is a need for a modular flange system which will accommodate modularity of components such as gears. The present invention advantageously provides such a flange system with common mounting features.

All documents cited herein, including the foregoing, are incorporated herein by reference in their entireties.

SUMMARY OF THE INVENTION

The present invention provides embodiments of a flange assembly with a modular mounting feature for removably securing a gear thereon. The embodiments facilitate easy assembly and reuse of components. Moreover, the embodiments allow installation of the component on the manufacturing line.

An aspect of the invention relates to a flange assembly including an imaging member and a flange. The imaging member includes a first end, a second end, an inside surface, and an outside surface. The flange includes a hub for securing to the imaging member and a protrusion for removably securing a component thereon. The hub has a length and fits inside the imaging member. The protrusion has a length and an outside surface and extends external to the imaging member.

In a further aspect, the invention relates to a flange assembly including an imaging member, at least one flange, and a least one fastening system. The imaging member extends between a first end and a second end and has an inside surface. The flange includes a hub and protrusion. The hub is for securing to the imaging member and the protrusion is for removably securing a component thereon. The hub of the flange interferencely fits inside the imaging member and the protrusion of the flange extends external to the imaging member. The fastening system is for a removably securing a component with the protrusion of the flange.

An additional aspect of the invention relates to a flange assembly in a marking device including a photoreceptor, at least one flange, and at least one gear. The photoreceptor extends between two ends and includes an inside surface. The photoreceptor is adapted to move in the marking device. The flange includes a hub and a protrusion. The hub of the flange interferencely fits inside the photoreceptor. The protrusion is for removably securing a gear thereon. The protrusion of the flange includes a periphery and extends external to the photoreceptor. The gear includes a diameter, a width, and a lumen therein, and is removably securable to the protrusion of the flange.

Another aspect of the invention relates to a process for using a modular flange including: inserting a hub of a flange in an end of an imaging member forming an imaging member flange assembly, the flange having a protrusion extending outside the imaging member; installing the imaging member and flange assembly in an imaging system; disposing an opening of a component over the protrusion; and removably securing the component to the protrusion using a fastening system. The process may further include: removing the component from the protrusion; and replacing the component with another component.

A further aspect of the invention relates to a xerographic apparatus including an imaging member, two flanges, and two gears. The imaging member extends between two ends and is adapted to move in the xerographic apparatus. Each flange includes a hub and a protrusion. The protrusion includes an outside surface. One of the hubs interferencely fits inside the imaging member at one end of the imaging member and the other one of the hubs interferencely fits inside the imaging member at the other end of the imaging member. The protrusion extends external to the imaging member at each of the two ends. Each gear includes a diameter, a width, and a lumen therein. The lumen includes an inside surface. The two gears are removably securable to the protrusion at the two ends. The protrusion and the gear cooperate and functionally engage the other at each of the two ends. One of the gears may transfers torque to the flange and the imaging member. The imaging member may be part of an imaging system.

Still other aspects and advantages of the present invention and methods of construction of the same will become readily apparent to those skilled in the art from the following detailed description, wherein embodiments are shown and described, simply by way of illustration. As will be realized, the invention is capable of other and different embodiments and methods of construction, and its several details are capable of modification and interchangeability in various obvious respects, all without departing from the invention. Accordingly, the drawing and description are to be regarded as illustrative in nature, and not as restrictive.

BRIEF DESCRIPTION OF THE DRAWINGS

FIG. 1 depicts a schematic view of the flange assembly of the present invention;

FIG. 2 is a schematic side view of assembly of FIG. 1;

FIG. 7 depicts a schematic view of an embodiment of the flange and gear of the present invention;

FIG. 8 depicts a front view of the flange and gear of FIG. 7;

DETAILED DESCRIPTION OF PREFERRED EMBODIMENTS

While the principles and embodiments of the present invention will be described in connection with an imaging apparatus, it should be understood that the present invention is not limited to that embodiment or to that application. Therefore, it should be understood that the principles of the present invention and embodiments extend to all alternatives, modifications, and equivalents thereof.

Figure 3:
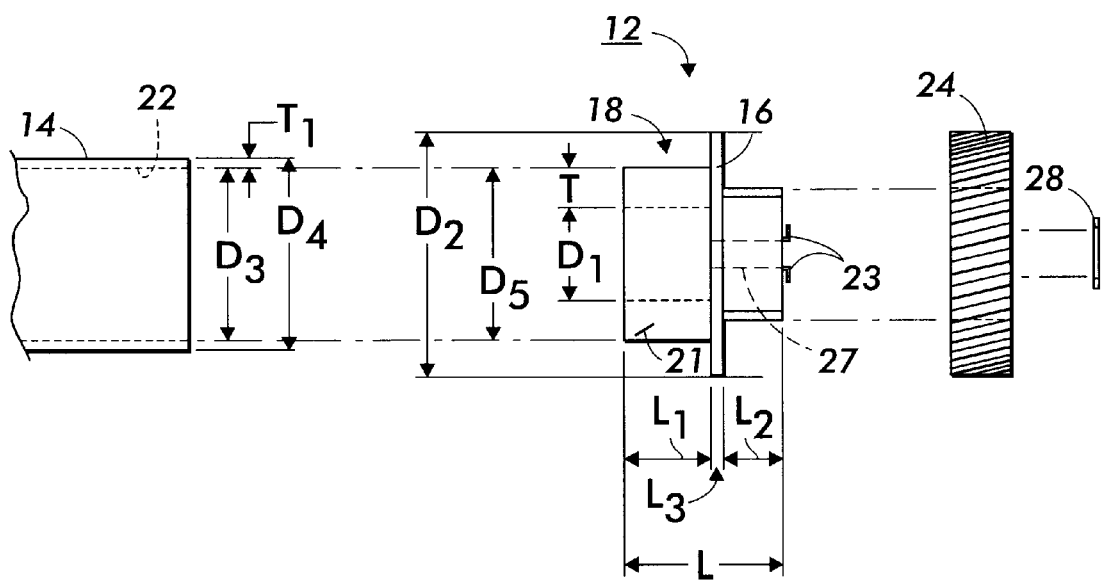
FIG. 3 depicts a side view of assembly of FIG. 1.

FIG. 1 illustrates an embodiment of a modular imaging member flange assembly 10. FIGS. 2–3 illustrate a flange 12, imaging member 14, gear 24, and a fastening system such as hooks 23 and a clip 28 to removably secure the gear 24 to the flange 12. The flange 12 includes a member 16 which is disk shaped, a hub 18 which extends axially from one side of the member 16, and a protrusion 20 which extends axially from the other side of the member 16. The hub 18 has an outside surface 21. The member 16 extends radially outside the hub 18 and the protrusion 20. In embodiments, the protrusion is of sufficient mass and strength to mount and removably secure a component such as a gear thereon.

FIGS. 2 and 3 further illustrate assembly of the flange 12 into an imaging member, for example, a photoreceptor 14. The flange is designed to allow the hub 18 to be pushed and inserted into the interior of the photoreceptor 14. As the hub 18 is pushed into the photoreceptor 14, the member 16 acts as a stop to prevent further insertion of the hub 18 into the photoreceptor 14. The hub 18 is inserted into the interior of the photoreceptor 14 until the end of the photoreceptor 14 and a face of the member 16 are in contact. The surface 21 of the hub 18 intimately contacts the surface 22 of the photoreceptor 14 and there is generally indiscernible clearance between the surfaces 21, 22. In operation, there is indiscernible relative movement between the flange 12 and the photoreceptor 14.

The contacting surfaces 21, 22 provide resistance against a torque applied to the flange 18 and the photoreceptor 14. The hub 18 withstands the inner radial compression load that is exerted upon it in the photoreceptor 14. The coefficients of thermal expansion of the photoreceptor 14 and the flange may be matched so that the interference fit is maintained independent of the temperature. Prior to assembly of the hub 18 into the photoreceptor 14, outside diameter D5 of the hub 18 is slightly larger than the inside diameter D3 of photoreceptor 14. The hub 18 is forced into the inside of photoreceptor 14 such that the surface 21 firmly contacts the surface 22 of the photoreceptor 14. The photoreceptor 14 expands slightly in the outward radial direction as the hub 18 is inserted. The relation of the outside diameter D5 of the hub 18 in relation to the inside diameter D3 of photoreceptor 14 should not cause the photoreceptor 14 to bulge and affect the total indicated runout (TIR) of the photoreceptor 14. Hub 18 may be secured to photoreceptor 14 by interference fit as disclosed in U.S. Pat. Nos. 6,104,896 and 5,815,773, the disclosures of which are incorporated by reference in their entireties.

After the flange is mounted to the photoreceptor 14, the gear may be placed over the protrusion. The clip 28 is then removably secured to the hooks 23 to prevent the gear from pulling off the protrusion in the direction of the axis x. A secondary gear (not shown) may be further associated with and mate with the teeth of the gear. A motor (not shown) may be used to rotate or drive the gear about axis x as indicated by arrow y. The flange may be mounted on one end or both ends of the photoreceptor 14 and the gear may be attached to one end or both ends of the photoreceptor 14. The flange may further include a shaft 27 which extends through the photoreceptor 14 and mounts to an imaging system. Alternatively, an individual shaft 27 at each flange may be mounted to an imaging system.

Figure 4:
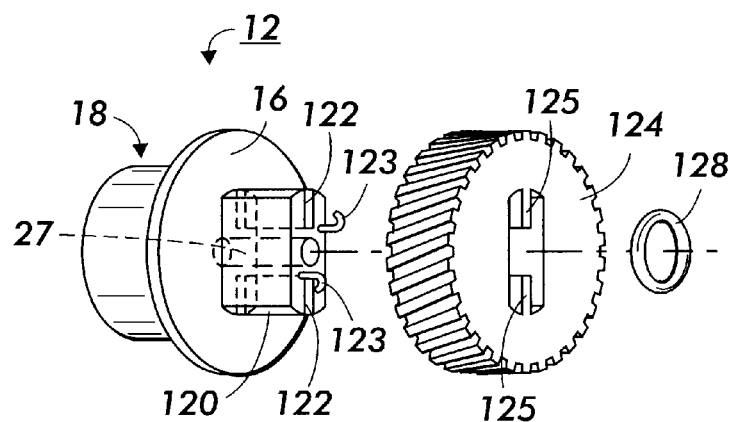
FIG. 4 depicts a schematic view of an embodiment of the flange and gear of the present invention.

FIG. 4 illustrates a flange 12 having a protrusion 120 with notch mounting system 122. A gear 124 includes tabs 125 which fit in the notches of the protrusion 120. The tabs 125 radially protrude into the opening of the gear 124 for a distance ranging from about 0.08 inch to about 0.20 inch; extend a width ranging from about 0.04 inch to about 0.8 inch; and have a thickness ranging from about 0.07 inch to about 0.18 inch. The tabs 125 may be about 0.005 inch to about 0.05 inch smaller, such as about 0.015 inch smaller than the notch for a generally secure fit. After the gear 124 is disposed over the protrusion 20, a ring 128 may be secured over hooks 123 to removably secure the gear 124.

Figure 5:
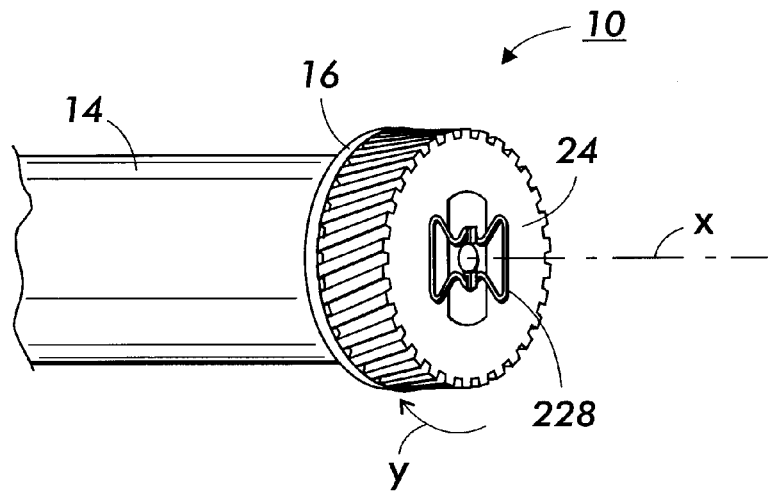
FIG. 5 depicts a schematic view of an embodiment of the flange and gear of the present invention.
Figure 6:
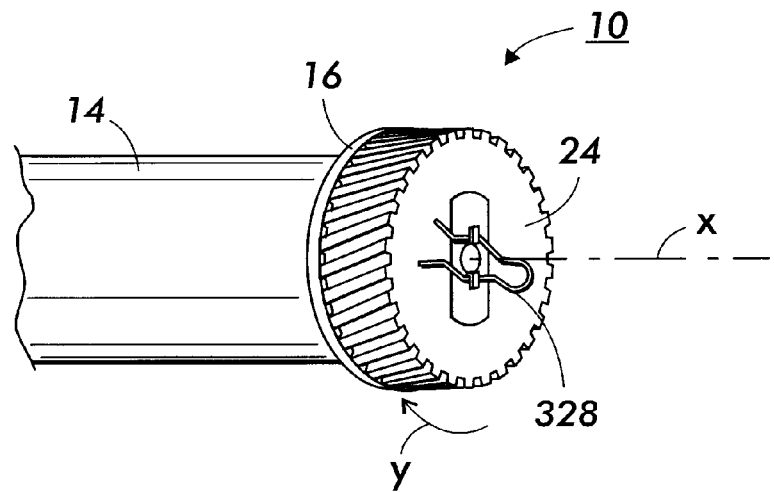
FIG. 6 depicts a front view of the flange and gear of FIG. 5.

FIGS. 5–6 illustrate various fastening systems for embodiments of the modular imaging member flange assembly 10. In FIG. 5, a clip 228 is secured over hooks 23 to removably secure the gear 24 on the flange 12. In FIG. 6, a clip 328 is secured over hooks 23 to removably secure the gear 24 on the flange 12.

FIGS. 7–8 illustrate an embodiment of the invention with a flange including a notch mounting system 222. The protrusion 220 may have a rectangular or oblong shape. The gear 224 includes tabs 225 in the opening that are sized to fit and cooperate with the notches. The tabs 225 may radially protrude into the opening of the gear 224 for a distance A ranging from about 0.08 inch to about 0.20 inch, extend a width B ranging from about 0.04 inch to about 0.9 inch, and have a thickness C ranging from about 0.07 inch to about 0.18 inch. In operation, the gear 224 fits securely over the protrusion 220 and the tabs 225 fit securely and slide smoothly into their respective notch of the protrusion 220. The tabs 225 may be about 0.005 inch to about 0.05 inch smaller, such as about 0.015 inch smaller than the notch for a generally secure fit. As the gear 224 is pushed toward the member 16 and nears the face of the member 16, the gear 224 is twisted an angle $\Theta$ ranging from about 3 degrees to about 40 degrees, such as about 15 degrees in a clockwise direction y, and the tabs 225 are rotated and further positioned in their respective notch of the protrusion 220. Seating the tabs 229 in the notches prevents the gear 224 from moving in the axial x direction. The gear 224 is driven by a motor or mating gear in the clockwise direction y which keeps the gear 224 in a seated position on the protrusion 220. Alternatively, the gear 224 and protrusion 220 may be designed such that the gear 224 is locked in a counterclockwise drive system.

Figure 9:
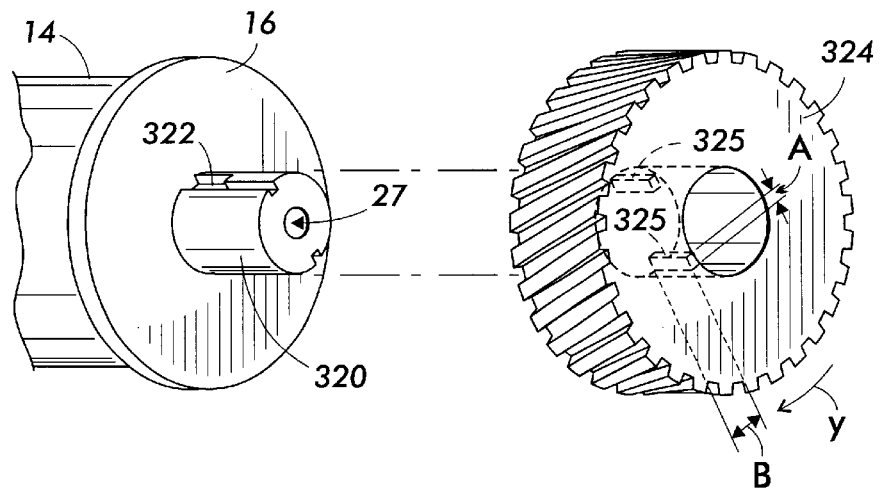
FIG. 9 depicts an embodiment of a fastening system used to hold the gear on the flange.
Figure 10:
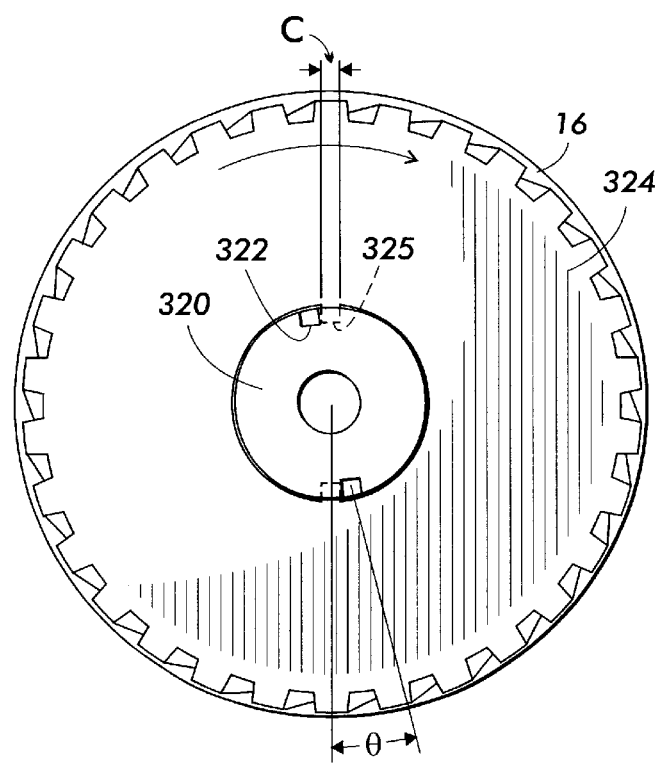
FIG. 10 depicts an embodiment of a fastening system used to hold the gear on the flange.

FIGS. 9–10 illustrate an embodiment of the invention with a flange including a protrusion 320 that is circular and a notch mounting system 322. The diameter of the protrusion 320 may range from about 0.40 inch to about 2.5 inches, such as about 0.50 inches. The gear 324 includes tabs 325 in the opening that are sized to fit and cooperate with the notches. The tabs 325 may radially protrude into the opening of the gear 324 for a distance A ranging from about 0.08 inch to about 0.20 inch, extend a width B ranging from about 0.04 inch to about 0.9 inch, and have a thickness C ranging from about 0.07 inch to about 0.18 inch. In operation, the gear 324 fits securely over the protrusion 320 and the tabs 325 fit securely and slide smoothly into their respective notch of the protrusion 320. The tabs 325 may be about 0.005 inch to about 0.05 inch smaller, such as about 0.015 inch smaller than the notch for a generally secure fit. As the gear 324 is pushed toward the member 16 and nears the face of the member 16, the gear 324 is twisted an angle $\Theta$ ranging from about 3 degrees to about 40 degrees, such as about 15 degrees in a clockwise direction y, and the tabs 325 are rotated and further positioned in their respective notch of the protrusion 320. Seating the tabs 325 in the to notches prevents the gear 324 from moving in the axial x direction. The gear 324 is driven by a motor or mating gear in the clockwise direction which keeps the gear in a seated position on the protrusion 320. Alternatively, the gear 324 may be designed such that the gear 324 is locked in a counterclockwise drive system.

Other sizes, variations and equivalents of the flange, gear, and fastening system for an imaging machine are also envisioned.

The gear may have teeth on its external periphery and include an opening therein that is about 0.005 inch to about 0.05 inch larger, such as about 0.015 inch larger than the outside periphery of the protrusion to which it is removably secured. The opening of the gear generally conforms to the shape of the outside periphery of the protrusion. The gear may be comprised of: polycarbonate; acrylonitrile butadiene styrene copolymer (ABS); nylon; or combinations thereof. The gear may be mounted over the protrusion and may be removably secured with various fastening systems. The gear may have a diameter ranging from about 0.9 inch to about 3.7 inches, such as about 1.30 inches, and a width ranging from about 0.08 inch to about 1 inch, such as about 0.40 inch.

Other flange and gear systems are also envisioned. For example, a gear may be removably secured to a flange at one or both ends of the photoreceptor 14; a gear may be removably secured to a flange at one end of the photoreceptor 14 and a cap or other fitting may be used at the other end of the photoreceptor 14; a stepped gear may be removably secured to a flange at one or both ends of the photoreceptor 14; and combinations thereof are envisioned. The gears may have various widths. Moreover, the gear may be formed in one-piece and include more than one distinct outside gear surface; the gear may be formed in one-piece with two distinct outside gear surfaces, with distinct diameters such as a stepped gear; and the gear may be formed in one-piece with two distinct outside gear surfaces spaced from the other, with the same diameter. Alternatively, multiple gears of the same or distinct diameter and various widths may be stacked together on a protrusion and used.

The relation between the protrusion and the component should include a generally snug fit that allows removable securement therebetween and a fit which includes centricity and generally little slackness. The gear may be of a size sufficient to fit in an imaging machine and may be made of a material compatible with other mating gears.

Various dimensions of the flange are envisioned. The flange may have a length L ranging from about 0.5 inch to about 3 inches, such as about 1 inch. The hub 18 may have a length L1 ranging from about 0.25 inch to about 2 inches, such as about 0.5 inch; an outside diameter D5 ranging from about 0.64 inch to about 3.23 inches, such as about 1.124 inches; an inside diameter D1 ranging from about 0.5 inch to about 2.9 inches, such as about 0.65 inch; and a thickness T ranging from about 0.15 inch to about 1.5 inches, such as about 0.60 inch. Alternatively, the interior of the hub 18 may be solid. The member 16 may have a length L3 ranging from about 0.04 inch to about 0.1 inch, such as about 0.06 inch; and a diameter D2 ranging from about 0.80 inch to about 3.50 inches, such as about 1.12 inches. The protrusion may extend from an end of the member 16 for a distance L2 ranging from about 0.20 inch to about 1 inch, such as about 0.40 inch. The protrusion may have an irregular or a non-circular cross-sectional shape that is, for example, square, rectangular, or oblong shape. The protrusion may have a height ranging from about 0.25 inch to about 2.5 inches, such as about 1 inch, and a width ranging from about 0.25 inch to about 2.5 inches, such as about 0.5 inch.

The flange may be made by fabrication processes such as injection molding, machining, or reaction injection molding. The flange may be formed in one-piece using a mold. Alternatively, the hub 18, the member 16, and the protrusion may be fabricated separately and from the same or different materials and then joined together. The flange may be secured without adhesives to the photoreceptor 14. The flange may have a modular mounting feature such as a protrusion that is common for a product line or photoreceptor line which requires a certain type of gear. The protrusion of the flange may be designed to be common for a certain size product or type of product.

The flange may be formed from a composite material including combinations of polycarbonate, polytetrafluoroethylene (PTFE) and glass. For example, the flange may be comprised of: (a) polycarbonate; (b) a composite of polycarbonate and PTFE; or (c) a composite of polycarbonate, PTFE, and carbon fiber composite. In embodiments of the invention, the flange may be comprised of about 75% polycarbonate, about 15% PTFE, and about 10% glass. Other combinations of these materials may be used, and the invention is not limited to these particular embodiments. The flange may also be comprised of a composite material including a combination of plastic and a conductive material in an amount sufficient to form an electrical ground path between the photoreceptor 14 and the flange. The plastic has a generally high impact strength and a generally high softening temperature. Those skilled in the art will recognize that it is possible to substitute similar or equivalent material for those listed such as fiberglass, plastic, and numerous other materials instead of glass. Alternative fastening designs such as tabs on the protrusion and notches on the gear are also envisioned. Notches about the perimeter of the protrusion may be used to accept and removably secure a clip or ring fastener for maintaining the gear on the protrusion. In addition, a clip or ring and post or hook system may be used in conjunction with a notch and tab system.

Alternative fastening system designs such as tabs on the protrusion and notches on the gear are also envisioned. In addition, notches circumferentially about the perimeter of the protrusion may be used to accept and removably secure a clip or ring fastener for maintaining the gear on the protrusion. Moreover, a clip or ring and post or hook system may be used in conjunction with a notch and tab system.

Various embodiment sizes and dimensions of the photoreceptor 14 are envisioned. The photoreceptor 14 may have an inside diameter D3 ranging from about 0.59 inch to about 3.22 inches, such as about 1.122 inches; an outside diameter D4 ranging from about 0.65 inch to about 3.31 inches, such as about 1.18 inches, a wall thickness T1 ranging from about 0.03 inch to about 0.05 inch, such as about 0.04 inch; and a length ranging from about 9.84 inches to about 39.37 inches, such as about 13.38 inches.

In operation, the flange provides torsional and axial support for photoreceptor 14. The flange transfers the torsional force applied by the gear to the photoreceptor 14. The photoreceptor 14 often operates under torsional loads of as much as 45 lbs-in. As the gear rotates, photoreceptor 14 rotates past a corona device (not shown) for charging of the photoreceptor 14 to a uniform electrostatic potential. A light image of an original document is then exposed onto the surface of photoreceptor 14 to selectively discharge areas of the surface which correspond to blank areas in the original image. A developer material is then brought into contact with the surface of the photoreceptor 14 to transform the latent image into a visible reproduction.

While this invention has been described in conjunction with various embodiments, it is evident that many alternatives, modifications, and variations thereof will be apparent to those skilled in the art. Accordingly, it is intended to embrace all such alternatives, modifications, and variations and their equivalents.

What is claimed is:

1. A flange assembly comprising:
   an imaging member including a first end, a second end, an inside surface, and an outside surface; and
   a flange including a hub and a protrusion, the hub of the flange fitting inside the imaging member, the protrusion of the flange having a length and an outside surface and extending external to the imaging member;
   a component having an outside periphery and a lumen, the component removably securable to the protrusion; and
   a fastening system for removably securing the component to the protrusion.

2. The flange assembly according to claim 1 wherein the component is adapted to rotate and transfer a torque to the protrusion and cause rotation of the imaging member.

3. The flange assembly according to claim 2 wherein the imaging member is a photoreceptor and wherein the component is a gear.

4. The flange assembly according to claim 3 wherein the imaging member is part of an imaging system.

5. The flange assembly according to claim 4 wherein at least one of the protrusion and the component includes a feature thereon for removable securement of the component to the protrusion.

6. The flange assembly according to claim 1 wherein the hub is secured to the imaging member without adhesives.

7. The flange assembly according to claim 1 wherein the component includes a different material than the flange.

8. The flange assembly according to claim 1 wherein the component is a gear having teeth for mating with another gear.

9. The flange assembly according to claim 1 wherein the component is removable from the protrusion and wherein the protrusion is adapted to receive a replacement component.

10. The flange assembly according to claim 1 wherein the hub is interferencely fit into the imaging member.

11. The flange assembly according to claim 1 wherein the protrusion functionally cooperates with the component for removably securing one to the other.

12. The flange assembly according to claim 1 wherein the fastening system includes at least one of a post and hook and at least one of a clip and ring.

13. The flange assembly according to claim 1 wherein the fastening system includes at least one of a tab and notch system.

14. The flange assembly according to claim 1 wherein the hub engages the imaging member and wherein an outside surface of the protrusion and an inside surface of the component functionally cooperate and engage the other.

15. The flange assembly according to claim 1 wherein the imaging member includes a flange at each of the first end and the second end.

16. A flange assembly comprising:
    an imaging member extending between a first end and a second end and having an inside surface; and
    at least one flange including a hub and protrusion, the hub of the at least one flange interferencely fitting inside the imaging member and the protrusion of the at least one flange extending external to the imaging member; and
    at least one fastening system for a removably securing a component with the protrusion of the at least one flange.

17. The flange assembly according to claim 16 further comprising a component wherein the protrusion of the at least one flange includes at least one of a notch and a tab for engagement with the other of at least one of a tab and a notch on the component.

18. The flange assembly according to claim 16 wherein the fastening system includes at least one of a hook and post on the protrusion for receiving at least one of a clip and ring.

19. A flange assembly in a marking device comprising:
    a photoreceptor extending between two ends and including an inside surface, the photoreceptor adapted to move in the marking device;
    at least one flange including a hub and a protrusion, the hub of the at least one flange interferencely fitting inside the photoreceptor, the protrusion of the at least one flange including a periphery and extending external to the photoreceptor; and
    at least one gear having a diameter, a width, and a lumen therein, the at least one gear removably securable to the protrusion of the at least one flange.

20. A flange assembly in a marking device comprising:
    a photoreceptor extending between two ends and including an inside surface, the photoreceptor adapted to move in the marking device;
    at least one flange including a hub and a protrusion, the hub of the at least one flange interferencely fitting inside the photoreceptor, the protrusion of the at least one flange including a periphery and extending external to the photoreceptor; and
    at least one gear having a diameter, a width, and a lumen therein, the at least one gear removably securable to the protrusion of the at least one flange;
    wherein the periphery of the protrusion is circular and further including a notch and tab fastening system.

21. A flange assembly in a marking device comprising:
    a photoreceptor extending between two ends and including an inside surface, the photoreceptor adapted to move in the marking device;

at least one flange including a hub and a protrusion, the hub of the at least one flange interferencely fitting inside the photoreceptor, the protrusion of the at least one flange including a periphery and extending external to the photoreceptor; and at least one gear having a diameter, a width, and a lumen therein, the at least one gear removably securable to the protrusion of the at least one flange;

wherein the periphery of protrusion is non-circular and further including at least one of a post and hook and at least one of a clip and ring fastening system.

22. A process for using a modular flange comprising:

inserting a hub of a flange in an end of an imaging member forming an imaging member flange assembly, the flange having a protrusion extending outside the imaging member;

installing the imaging member and flange assembly in an imaging system;

disposing an opening of a component over the protrusion; and removably securing the component to the protrusion using a fastening system.

23. The process of claim 22 further comprising: removing the component from the protrusion; and replacing the component with another component.

24. A xerographic apparatus comprising:

an imaging member extending between two ends, the imaging member adapted to move in the xerographic apparatus;

two flanges, each flange including a hub and a protrusion including an outside surface, one of the hubs interferencely fitting inside the imaging member at one end of the imaging member and the other one of the hubs interferencely fitting inside the imaging member at the other end of the imaging member, the protrusion extending external to the imaging member at each of the two ends; and two gears, each gear including a diameter, a width, and a lumen therein, the lumen including an inside surface, the two gears being removably securable to the protrusion at the two ends;

wherein the protrusion and the gear cooperate and functionally engage the other at each of the two ends.

* * * * *